Aug. 4, 1959 T. A. KOSTYRKA 2,897,708
AUTOMATIC DRIVING CENTER
Filed Aug. 3, 1953 3 Sheets-Sheet 1
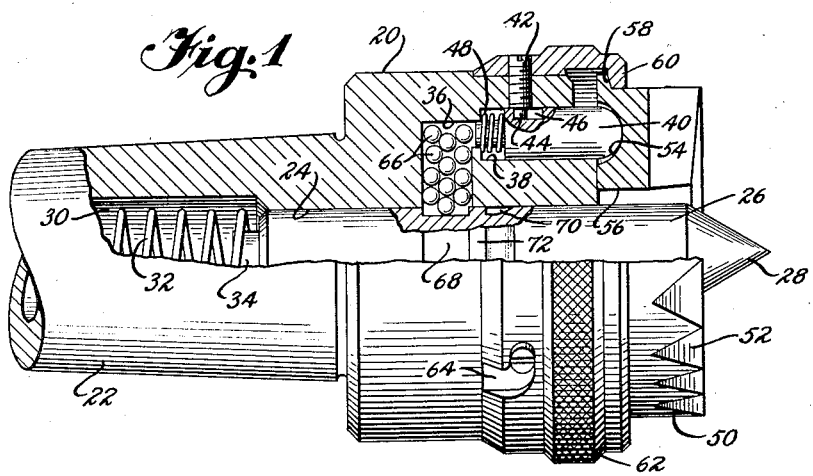
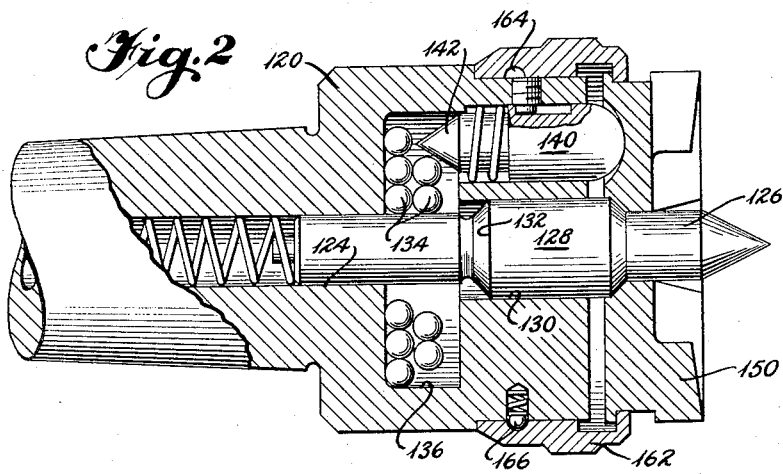
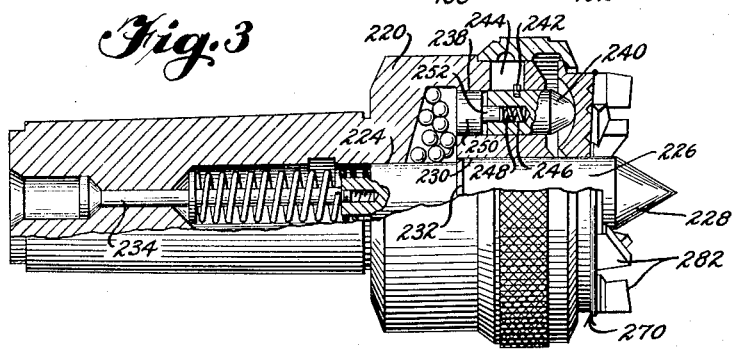
INVENTOR
*Thaddaus Alfred Kostyrka*
BY
*Mead, Browne, Schuyler & Beveridge*
ATTORNEYS Aug. 4, 1959     T. A. KOSTYRKA     2,897,708
AUTOMATIC DRIVING CENTER
Filed Aug. 3, 1953     3 Sheets-Sheet 2

INVENTOR
Thaddaus Alfred Kostyrka

BY
Mead, Browne, Schuyler & Beveridge
ATTORNEYS

Aug. 4, 1959 T. A. KOSTYRKA 2,897,708
AUTOMATIC DRIVING CENTER
Filed Aug. 3, 1953 3 Sheets-Sheet 3
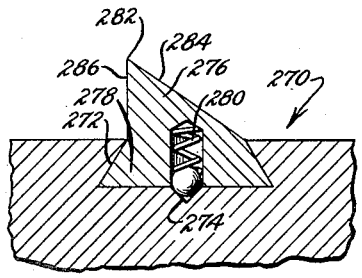
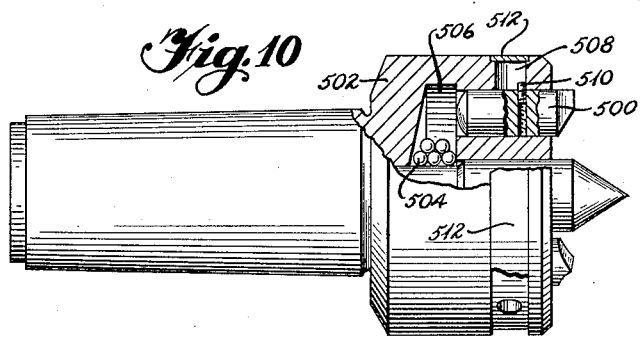
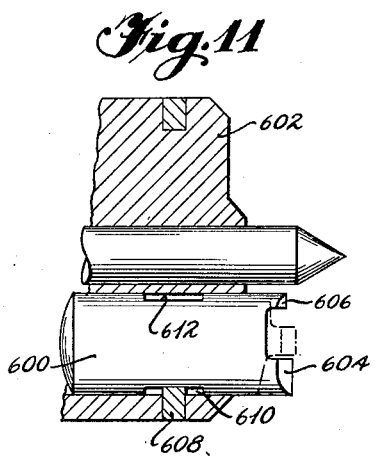
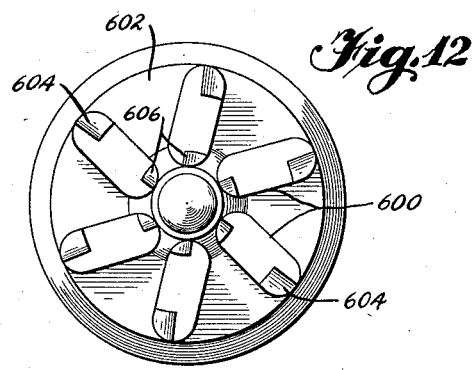
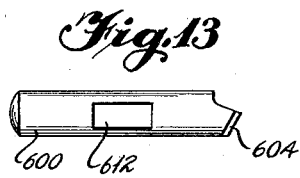
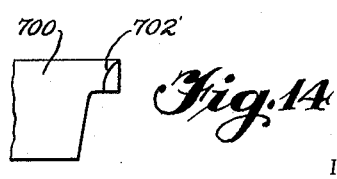
INVENTOR
Thaddaus Alfred Kostyrka
BY
Mead, Browne, Schuyler and Beveridge
ATTORNEYS

United States Patent Office 2,897,708
Patented Aug. 4, 1959

2,897,708

AUTOMATIC DRIVING CENTER

Thaddeus Alfred Kostyrka, Stuttgart, Germany

Application August 3, 1953, Serial No. 372,014

Claims priority, application Germany August 4, 1952

5 Claims. (Cl. 82—33)

This invention relates to driving centers for machine tools, and more particularly to a driving center having a center point which is automatically axially locked in position by clamping pressure exerted by the work piece against a work engaging clamp member.

In a machine tool such as a lathe, it is desirable that the center point be free to move axially while the work piece is being clamped against gripping jaws as by actuation of the tail stock of the lathe toward the driving center. When the work piece is located in its final clamped position, it becomes desirable to clamp the center point against further axial movement in order that the point may engage the center bore of the work piece to support it accurately during driving movement.

Accordingly, it is an object of this invention to provide a driving center for a machine tool in which the center point is automatically clamped in position against axial movement when the work piece has been clamped with respect to the driving center.

It is a further object of this invention to provide a driving center having a center point which is clamped in position by the clamping force exerted by the work piece against the work engaging surface of the driving center.

In the achievement of these and other objects, a driving center embodying the present invention in general includes a head or housing having a tapered shaft projecting coaxially from one end. The shaft and housing include a central axial bore within which a center point is mounted for axial movement, the center point having a point at one end which projects axially from the side of the head opposite the shaft. Within the head, the center point passes through an annular chamber and a plurality of pin shaped support elements are mounted for axial movement within bores communicating with the annular chamber at symmetrically disposed location radially outwardly from the center point. The support members are adapted to be driven axially into the housing upon the exertion of clamping engagement between gripping jaws and the work piece. In some cases, the gripping jaws may be integral with the support members; in other cases, the gripping jaws may be separable from the support members. Axially inward movement of the support members applies pressure to a plurality of metal balls which substantially fill the annular chamber. As pressure is supplied to the metal balls, they are forced against the exposed surface of the center point within the annular chamber. Preferably, the center point is provided with a radially extending shoulder against which the balls exert force to clamp the center point against further axial movement. The clamping force on the center point is thus developed from the clamping force exerted on the work piece.

Other features, objects and advantages of the invention will become apparent by reference to the following specification, taken in conjunction with the accompanying drawings, in which:

Fig. 1 is a side elevation view, partially in section, of a driving center embodying the present invention including a driving disc member having fixed work engaging teeth;

Fig. 2 is a side elevation view, partially in section, of another form of driving center employing a driving disc member having fixed work engaging teeth;

Fig. 3 is a side elevation view, partially in section, of still another form of driving center having a modified form of driving disc;

Figure 4:
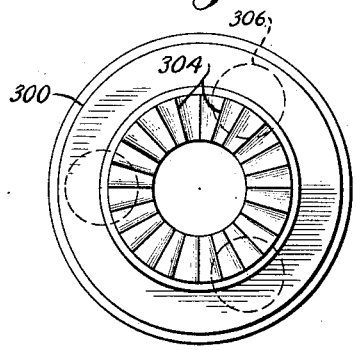
Figure 6:
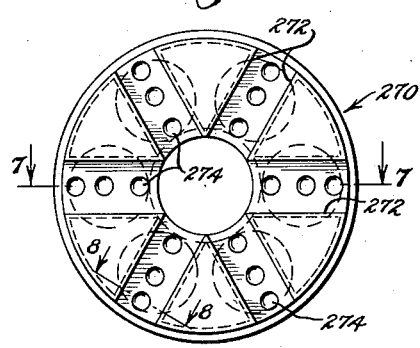
Figure 5:
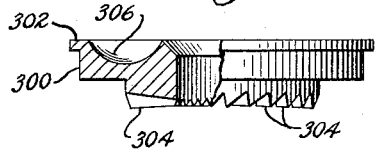
Figure 7:
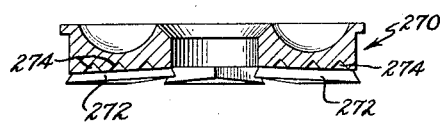
Figure 9:
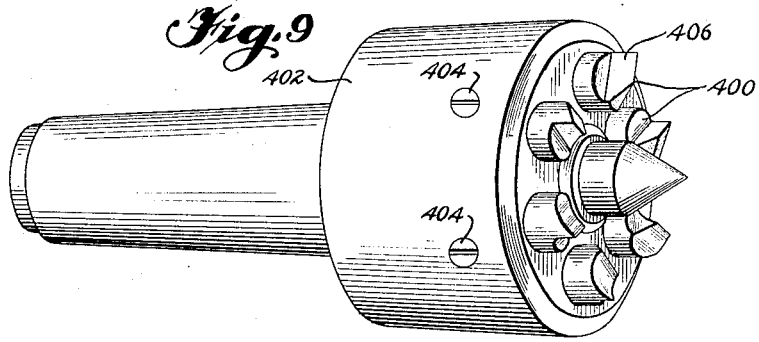

Fg. 4 is a front elevation view of a fixed tooth driving disc similar to those of Figs. 1 and 2, for engaging a work piece of smaller diameter;

Fig. 5 is a side elevation view, partially in section, of the driving disc of Fig. 4;

Fig. 6 is a front elevation view of the driving disc of Fig. 3;

Fig. 7 is a cross sectional view of the disc of Fig. 6, taken on the line 7—7 of Fig. 6;

Fig. 8 is a fragmentary cross sectional view taken on the line 8—8 of Fig. 6, showing a work engaging tooth mounted on the disc of Fig. 6;

Fig. 9 is a perspective view of still another form of driving center wherein the support elements directly engage the work piece;

Fig. 10 is a side elevation view, partially in section, of a driving center similar to Fig. 9, showing a modified construction for mounting the support members in the head;

Fig. 11 is a partially cross sectional view taken through the central axis of a driving center similar to those of Figs. 9 and 10, showing a modified form of work engaging support member;

Fig. 12 is a front elevation view of the driving center of Fig. 11;

Fig. 13 is a side elevation view of the support element employed in Figs. 11 and 12; and Fig. 14 is a modified form of support element for use with the driving disc of Fig. 12.

Referring first to Fig. 1, the driving center there disclosed includes a head or housing 20 having an integral tapered shaft 22 projecting coaxially from the rearward end of the housing. It is believed apparent that head 20 and shaft 22 are circular in tranverse cross section at any point. A central bore 24 extends axially into housing 20 and shaft 22 from the front face of head 20 and slidably receives a center point 26 which is formed with a tapered point 28 at its projecting end to engage the center bore of a work piece in a well known manner. At its inner end, bore 24 is formed with a radially enlarged section 30 within which is mounted a compression spring 32 which is seated upon the inner end of center point 22 and centered by means of a reduced diameter section 34 projecting rearwardly from the center point and received within the end coils of spring 32. The opposite end of spring 32 is seated against the inner end of enlarged diameter section 30. Since spring 32 is in compression, it is believed apparent that the spring acts to move center point 26 outwardly of bore 24, that is, center point 26 is biased to the right in Fig. 1.

An enlarged annular chamber 36 is formed within head 20 to surround center point 26. A plurality of axial bores 38 extend inwardly from the front face of head 20 to communicate with annular chamber 36. Bores 38 are located at symmetrically spaced positions at equal radial distances from the central axis of head 20. The number of bores may vary with the application of the center; in general, three bores 38 are formed in smaller size driving centers while larger centers are usually constructed with six bores 38.

A pin-shaped support member 40 is mounted for axial sliding movement within each bore 38. Rotary movement of support member 40 within bore 38 is prevented by a set screw 42 threaded into head 20 and having a projecting tip 44 which is slidably received within a longitudinal groove 46 cut into support member 40. One end of groove 46 abuts tip 44 to limit axial movement of support member 40 outwardly of bore 38. In the Fig. 1 embodiment, support member 40 is biased to its axially outermost position by a compression spring 48 which engages a shoulder on support member 40 at one end and is seated at its other end against a shoulder formed in head 20 by a reduced diameter section at the inner end of bore 38. The reduced diameter section at the inner end of support member 40 passes freely through the reduced diameter section of the bore 38. If desired, pins 40 may be elastic in themselves and consist entirely or partly of rubber or other resilient material.

In the Fig. 1 embodiment, the driving disc 50 which engages the work piece is constructed with a serrated work engaging surface formed by a plurality of radially extending edged projections 52. The inner surface of driving disc 50 is formed with a plurality of hemispherical indentations 54 which are adapted to receive the rounded outer ends of support members 40. It is believed apparent that the number and location of indentations 54 will correspond to the number and location of support members 40. A central bore 56 extends through driving disc 50 and provides ample radial clearance between center point 26 and disc 50. A radially outwardly projecting annular lip 58 on the rearward surface of disc 50 engages an inwardly projecting annular flange 60 on a coupling ring 62 which is mounted upon head 20 by means of a bayonet lock shown generally at 64. The biasing force of springs 48 normally maintains lip 50 in engagement with flange 60 in the manner shown in Fig. 1.

Annular chamber 36 is filled with a plurality of steel balls 66. Center point 26 is formed with a reduced diameter section 68 having a radially extending shoulder at each end. The depth of reduced diameter section 38, or conversely the radial dimension of the shoulders at either end of the reduced diameter section, is selected to be somewhat greater than the radius of a ball 66 but less than the diameter of a ball 66. In the Fig. 1 embodiment, a tapered groove 70 is also formed axially forwardly from reduced diameter section 68 to form an annular ring 72 on the outer surface of pin 26.

The Fig. 1 embodiment is operated in the following manner. Tapered shaft section 22 is seated within and coupled to be driven in rotation by the machine tool with which the center is to be employed. The work piece to be driven is seated at one end on the tail stock of the machine and its opposite end is placed in engagement on the point 28 of center point 26. With the work piece positioned in this fashion, the tail stock is moved, in a manner well known in the art, toward the driving center. A radial end surface on the work piece will thus be moved into engagement with the serrated radial surface of driving disc 50. As the tail stock is moved toward the driving center, center point 26 is forced to the left in Fig. 1 against the compressive force of spring 32 and as the work piece moves against the action of their associated compressive springs 48. As the driving disc moves to the left in Fig. 1, it drives the support members 40 to the left to force the left-hand ends of the driving members into annular chamber 36. Since annular chamber 36 is substantially filled with steel balls 66, pressure is developed with chamber 36 and the balls 66 are forced against the exposed surface of center point 26 in reduced diameter section 68 and also against the surface in the region of tapered groove 70 which, at this time, will be located somewhere within chamber 36 due to the axial leftward movement of center point 26 from engagement with the work piece. Thus, as the work piece is clamped against the serrated surface of driving disc 50, the clamping force is transmitted through balls 66 to center point 22 and, by virtue of the frictional engagement of balls 66 with the surface of center point 26, including both sides of integral annular ring 72, center 26 is firmly clamped against further axial movement.

When the work piece is firmly clamped upon the driving center, the center is rotated and the rotary motion of head 20 is transmitted through support members 40 to driving disc 50 and hence to the work piece. It is believed apparent that the manner in which driving disc 50 is mounted upon head 20 permits the head to be tilted to compensate for any lack of squareness in the face of the work piece which engages the driving disc.

A modified form of driving center is shown in Fig. 2. Since this center functions in the same manner as the driving center of Fig. 1, it will be described primarily by pointing out the distinctions between the two embodiments. In the Fig. 2 embodiment, the head 120 is formed with a central bore 124 within which the center point 126 is slidably received. Center point 126 is constructed with an enlarged diameter section 128 which is received within an enlarged diameter section 130 of bore 124. This construction defines an enlarged rearwardly facing shoulder 132 on center point 126. By virtue of the enlarged shoulder 132, balls 134 employed in the Fig. 2 embodiment are somewhat larger; again as in the case of Fig. 1, the radial dimension of shoulder 132 is larger than the radius of ball 134 but smaller than its diameter. The support pins 140 of the Fig. 2 embodiment are formed with a tapered point 142 on their rearward end which projects into annular chamber 136 at all times. Driving disc 150 is supported upon pins 140 in the same manner as in the Fig. 1 embodiment; in the Fig. 2 construction, disc 150 is held upon head 120 by an annular coupling ring 162 which is formed within an internal annular groove 164 which engages detents 166 mounted in head 120.

Still another form of construction is disclosed in Fig. 3; in this case, the head 220 is again formed with a central bore 224 which receives center point 226. As in the case of the Fig. 2 embodiment, the outer end of bore 224 is enlarged as at 230 to receive an enlarged diameter section 232 of center point 226. In this manner, a radially extending shoulder 232 is formed on center point 226. A stop rod 234 is threaded into the inner end of center point 226 to limit outward movement of center point 226.

In the Fig. 3 embodiment, support pin 240 is guided in axial movement by means of a projecting screw 242 threaded into member 240 and slidably engageable with the walls of an axial slot 244 formed in head 220. The inner end of member 240 is formed with a central bore 246 within which is seated a compression spring 248. A piston-like member 250 is slidably received within bore 238 and includes a reduced diameter section 252 which projects into bore 246 and engages spring 248.

Balls 266 within annular chamber 268 prevent piston member 250 from moving into the chamber when the various parts of the assembly are in the disengaged condition shown in Fig. 3. When a work piece is moved into engagement with the driving disc assembly 270 of the Fig. 3 embodiment, the work engaging pressure is transmitted first through spring 248 and then by the direct engagement of the rearward surface of support member 240 and piston 250 and hence through the balls to center point 226.

The driving disc assembly 270 of the Fig. 3 embodiment is disclosed in somewhat greater detail in Figs. 6, 7 and 8. As best seen in Fig. 6, the front face of disc 270 is formed with a plurality of radially extending dovetail slots 272. The bottom or inner wall of each slot 272 is formed with a plurality of radially spaced tapering bores 274. These bores may be said to be located on concentric circles which are centered on the central axis of member 270. A plurality of work gripping points 276 (see Fig. 8) are formed with base portion 278 constructed to be snugly received within radial slots 272. A downwardly facing detent assembly 280 is provided on each member 276 to engage a selected bore 274 at the bottom of dovetail slots 272. In this manner, the work engaging points 276 may be located at adjusted radial positions with respect to the axis of the assembly.

In Figs. 4 and 5, a driving disc assembly 300, adapted to be substituted for the driving disc 50 of the Fig. 1 embodiment or 150 in the Fig. 2 embodiment, is shown. The disc assembly of Figs. 4 and 5 is especially adapted for use with smaller diameter work. Thus, assuming the radial lip 302 of disc 300 to be of a diameter equal to the radial lip 58, for example, of the Fig. 1 embodiment, the serrated work engaging surface of the discs of Figs. 4 and 5 is located radially somewhat inwardly of the disc as compared to the location of the serrations 52 of the disc 50. Disc 300 is provided with three hemispherical indentations 306 for use with a driving head provided with three support members.

The projecting portion of member 276 is formed with a sharp upper edge 282 by means of which the member 276 may be forced into the surface of the work piece to obtain a firm driving engagement between the driving center and the work piece. The attitude of the edge may be modified as desired by varying the inclinations of the respective flanks 284 and 286. In general, the flank of the tooth located on its forward side with respect to the direction of rotation will be inclined more steeply. Thus, the flank 286 in Fig. 8 would be on the forward side of the tooth with respect to the direction in which it is rotated. The angle of inclination of front flank 286 from the vertical usually is between 5° and 25° while the inclination of rear flank 284 is usually between 30° and 45°.

In Figs. 9 through 13, further embodiments of driving centers are disclosed which distinguish from the previously described forms primarily in that the support members are constructed to engage the work piece directly. Constructional details of the center point receiving bore, center point, and annular ball-containing chamber which are not fully disclosed in these figures may be assumed to take any of the forms shown in Figs. 1 through 3.

In the Fig. 9 construction, the support members 400 are mounted within head 402 in a manner similar to the construction employed to mount support members 40 of the Fig. 1 embodiment or support members 140 of the Fig. 2 embodiment in their respective heads. Thus, screws 404 are threaded into head 402 to engage axial slots (not shown) in the respective members 400 which, as in the previously described forms, are biased to their outermost positions by springs such as 48 in Fig. 1. At their outer ends, members 400 are formed with teeth 406 which are suitably shaped to obtain a good driving connection in the particular use to which they are put.

Fig. 10 is substantially similar to the driving center of Fig. 9 with the exception that its support members 500 are mounted within head 502 in the same manner that support members 240 are coupled to head 220 in the Fig. 3 embodiment. The Fig. 10 embodiment does not employ a return spring in combination with the support member 500. It will be appreciated that the balls 504 of the Fig. 10 construction fill annular chamber 506 to a degree where support member 500 is positioned somewhere away from its innermost limit of travel. In this embodiment, the guide slots 508 which guide screws 510 mounted in support members 500 are closed at their outer end by a resilient annular ring 512 which extends around the outer periphery of head 502.

In Figs. 11 through 14, a modified type of support member is disclosed which distinguishes from the previously described members in that they are constructed with a generally oval-shaped transverse cross section. This cross section is best appreciated in Fig. 12 wherein six pins 600 are disposed within a head 602. In the embodiment of Figs. 11–13, each support member 600 is constructed to have an enlarged tooth 604 at one side of its outer end and a somewhat smaller driving tooth 606 at the opposite side of the outer end. In Fig. 12, the driving center is shown with the larger teeth 604 located at the radially outermost side of the member with respect to the center of the head. Assuming that large diameter work is to be driven, it is seen that the teeth 604 are oriented to exert a driving force when head 602 of Fig. 12 is rotated in a counterclockwise direction. Axial movement of the support members 600 when in the Fig. 12 position is limited by the engagement of a resilient annular ring 608 which is seated within an annular groove extending around the outer periphery of heads 602 and projecting inwardly of the head to be received within a guide slot 610 formed in member 600.

Because of the symmetrical cross section of the members 600, it is believed apparent that they may be removed from the respective openings in which they are received, turned at 180°, and replaced in the openings in a fashion such that the teeth 606 would then be the radially outermost teeth of the member. This not only reverses the radial position of teeth 604 and 606, but also reverses the rotative direction in which they face. A second guide slot 612 is formed in each member 600 for engagement with annular member 608 to limit axial movement of members 600 when in the position reversed from that shown in Figs. 11 and 12. As shown in Fig. 12, the oval cross sections are positioned in a fashion somewhat inclined to a true radial alignment with the center of head 602. This radial inclination may obviously be varied in accordance with the type of work to be performed by the driving center. As in the case of the Fig. 10 construction, no return spring is shown or employed with the construction of Figs. 11 and 12.

Fig. 14 discloses a modified form of support member 700 generally similar to support member 600 with the exception that the member 700 includes only a single tooth 702. It is believed apparent that many other modifications of the tooth structure and arrangement may be chosen in accordance with the characteristics of the work piece to be driven from the drive head.

The operation of the various embodiments has been described in connection with Fig. 1, and it is believed apparent that all of the various embodiments operate in the same fashion.

To briefly summarize the operative features, it will be recalled that a work piece to be driven from the driving center is forced axially against the work piece engaging members of the drive center. In each case, the center point of the assembly will be received within a center bore in the work piece. In all embodiments, the center point is free to move axially into its head against the force exerted by its return spring. Movement of the work piece against the assembly forces the support members axially into their respective bores.

In the embodiments of Figs. 1–3, the work piece is engaged by a driving disc assembly. In the embodiments of Figs. 9–14, the support members are formed with teeth which directly engage the work piece. In either case, the serrated edge or edges of the work piece engaging member are driven into the face of the work piece. It should be emphasized that the end of the work piece to be engaged by the driving center need not be absolutely flat or square since compensating movement of either of the individual support members in the case where they directly engage the work piece or tilting movement of the driving disc in the embodiments of Figs. 1–3 may compensate for any out of squareness. The initial compensating movement, as by tilting of a driving disc, causes some rearrangement of the balls contained within the annular chamber. After this compensation has occurred, further movement of the work piece against the driving center forces all support members inwardly simultaneously to decrease the volume of the annular chamber, thereby forcing the balls against the shoulders formed on the center points to prevent further axial retreat of the center points into the head.

Release of the work is accomplished in the reverse fashion. When the pressure forcing the work piece against the driving center is released, the pressure against the balls and center point is likewise released, thus permitting the center point to push the work off the work engaging surfaces by action of the return spring.

While I have shown exemplary embodiments of my invention, it will be apparent to those skilled in the art that the disclosed embodiments may be modified. Therefore, the foregoing specification is to be considered exemplary rather than limiting, and the true scope of my invention is that defined in the following claims.

I claim:

1. A driving center for engaging and driving a rotated workpiece, said driving center comprising an elongated drive sleeve having a drive end and an elongated passage extending axially inwardly from said drive end, an elongated center point located within said axial passage and extending beyond said drive end, biasing means located within said axial passage and engaging said center point to urge said center point axially outwardly with respect to said drive end, said drive sleeve having an annular chamber positioned axially inwardly from said drive end and surrounding said center point, said drive sleeve also having a plurality of passages extending axially inwardly from said drive end and communicating with said annular chamber, said passages being located radially with respect to the sleeve axis and being disposed about said center point, a plurality of drive pins corresponding in number to the number of said sleeve passages, there being a drive pin located in each passage and each drive pin having a drive shoulder extending axially beyond the drive end of said drive sleeve, means carried by said drive sleeve and engaging each drive pin to prevent turning movement of said drive pin within the passage in which it is located but permitting said drive pin to move in an axial direction with respect to said passage, each drive pin having an end which is projected into said annular chamber when the drive pin moves axially inwardly with respect to the drive end of said drive sleeve, a shoulder member on said center point positionable within the axial extent of said annular chamber when said center point is moved axially inwardly with respect to the drive end of said drive sleeve, and means located within said annular chamber and surrounding said center point to transmit force from any of said drive pins to said center point shoulder when any of said drive pins moves axially inwardly with respect to the drive end of said drive sleeve to restrain said center point by the action of said force force transmitting means against further movement axially inwardly with respect to the drive end of said drive sleeve.

2. A driving center for engaging and driving a rotated work piece, said driving center comprising an elongated drive sleeve having a drive end and an elongated passage extending axially inwardly from said drive end, an elongated center point located within said axial passage and extending beyond said drive end, biasing means located within said axial passage and engaging said center point to urge said center point axially outwardly with respect to said drive end, said drive sleeve having an annular chamber positioned axially inwardly from said drive end and surrounding said center point, said drive sleeve also having a plurality of passages extending axially inwardly from said drive end and communicating with said annular chamber, said passages being located radially with respect to the sleeve axis and being disposed about said center point, a plurality of drive pins corresponding in number to the number of said sleeve passages, there being a drive pin located in each passage and each drive pin having a drive shoulder extending axially beyond the drive end of said drive sleeve, means carried by said drive sleeve and engaging each drive pin to move in an axial direction with respect to said passage, each drive pin having an end which is projected into said annular chamber when the drive pin moves axially inwardly with respect to the drive end of said drive sleeve, a shoulder member on said center point positionable within the axial extent of said annular chamber when said center point is moved axially inwardly with respect to the drive end of said drive sleeve, and a plurality of metal balls filling said annular chamber and surrounding said center point to transmit force from any of said drive pins to said center point shoulder when any of said drive pins moves axially inwardly with respect to the drive end of said drive sleeve to restrain said center point against further movement axially inwardly with respect to the drive end of said drive sleeve.

3. A driving center according to claim 2, wherein each of said metal balls is of substantially the same size and shape and each has a radius which is less than the radial distance from the bottom to the top of said center point shoulder.

4. A driving center according to claim 3, wherein each metal ball has a diameter greater than the radial distance from the bottom to the top of said center point shoulder.

5. A driving center for engaging and driving a rotated workpiece, said driving center comprising an elongated drive sleeve having a drive end and an elongated passage extending axially inwardly from said drive end, an elongated center point located within said axial passage and extending beyond said drive end, biasing means located within said axial passage and engaging said center point to urge said center point axially outwardly with respect to said drive end, said drive sleeve having an annular chamber positioned axially inwardly from said drive end and surrounding said center point, said drive sleeve also having a plurality of passages extending axially inwardly from said drive end and communicating with said annular chamber, said passages being located radially with respect to the sleeve axis and being disposed about said center point, a plurality of drive pins corresponding in number to the number of said sleeve passages, there being a drive pin located in each passage and each drive pin having a drive shoulder extending axially beyond the drive end of said drive sleeve, means carried by said drive sleeve and engaging each drive pin to prevent turning movement of said drive pin within the passage in which it is located from either of two driving positions displaced 180° from each other but permitting said drive pin to move in an axial direction with respect to said passage, each drive pin having an end which is projected into said annular chamber when the drive pin moves axially inwardly with respect to the drive end of said drive sleeve, a shoulder member on said center point positionable within the axial extent of said annular chamber when said center point is moved axially inwardly with respect to the drive end of said drive sleeve, and means located within said annular chamber and surrounding said center point to transmit force from any of said drive pins to said center point shoulder when any of said drive pins moves axially inwardly with respect to the drive end of said drive sleeve to restrain said center point by the action of said force transmitting means against further movement axially inwardly with respect to the drive end of said drive sleeve.

References Cited in the file of this patent

UNITED STATES PATENTS

| 99,269 | West | Jan. 25, 1870 |
| 1,320,660 | Thompson | Nov. 4, 1919 |
| 1,829,619 | Svenson | Oct. 27, 1931 |
| 2,392,186 | Pierle | Jan. 1, 1946 |
| 2,426,376 | Smallpeice | Aug. 26, 1947 |
| 2,545,852 | Kurzweil | Mar. 20, 1951 |
| 2,576,704 | Smith | Nov. 27, 1951 |
| 2,704,006 | Rost | Mar. 15, 1955 |

FOREIGN PATENTS

| 380,160 | Germany | Sept. 3, 1923 |
| 413,240 | Italy | Apr. 5, 1946 |
| 579,270 | Germany | June 22, 1933 |